United States Patent
Aslot et al.

(10) Patent No.: US 8,677,374 B2
(45) Date of Patent: Mar. 18, 2014

(54) RESOURCE MANAGEMENT IN A VIRTUALIZED ENVIRONMENT

(75) Inventors: Vishal C. Aslot, Austin, TX (US); Brian W. Hart, Austin, TX (US); Anil Kalavakolanu, Austin, TX (US); Evelyn T. Yeung, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 190 days.

(21) Appl. No.: 13/232,211

(22) Filed: Sep. 14, 2011

(65) Prior Publication Data

US 2013/0067467 A1 Mar. 14, 2013

(51) Int. Cl.
G06F 9/46 (2006.01)
G06F 9/455 (2006.01)
G06F 11/00 (2006.01)
G06F 11/16 (2006.01)

(52) U.S. Cl.
USPC ............. 718/104; 718/1; 718/100; 718/102; 718/105; 714/2; 714/4.1; 714/4.11; 714/4.12; 714/6.1; 714/6.12; 714/6.3; 714/37; 714/38.1; 714/38.11

(58) Field of Classification Search
None
See application file for complete search history.

(56) References Cited

U.S. PATENT DOCUMENTS

| | | | |
|---|---|---|---|
| 5,345,590 A | 9/1994 | Ault et al. | |
| 6,260,068 B1 * | 7/2001 | Zalewski et al. | 709/226 |
| 6,496,941 B1 * | 12/2002 | Segal et al. | 714/4.2 |
| 6,687,799 B2 * | 2/2004 | Smullen et al. | 711/154 |
| 6,820,217 B2 * | 11/2004 | Mock et al. | 714/15 |
| 6,950,832 B2 * | 9/2005 | Brown et al. | 714/6.12 |
| 7,178,059 B2 * | 2/2007 | Greenspan et al. | 714/13 |
| 7,321,982 B2 | 1/2008 | Coatney et al. | |
| 7,437,524 B2 * | 10/2008 | Narayan et al. | 711/161 |
| 7,490,265 B2 * | 2/2009 | Baskey et al. | 714/15 |
| 7,770,056 B2 | 8/2010 | Malaviya | |
| 7,831,857 B2 * | 11/2010 | Muppirala et al. | 714/5.11 |
| 2003/0131039 A1 * | 7/2003 | Bajoria et al. | 709/1 |
| 2004/0177342 A1 | 9/2004 | Worley, Jr. | |
| 2007/0220350 A1 * | 9/2007 | Ogasawara et al. | 714/38 |
| 2008/0005609 A1 * | 1/2008 | Zimmer et al. | 714/5 |
| 2008/0155553 A1 * | 6/2008 | Astigarraga et al. | 718/108 |
| 2008/0195836 A1 * | 8/2008 | Muppirala et al. | 711/173 |
| 2008/0294839 A1 * | 11/2008 | Bell et al. | 711/104 |
| 2009/0119463 A1 * | 5/2009 | Hsu et al. | 711/151 |
| 2009/0240849 A1 | 9/2009 | Corneli et al. | |
| 2009/0248949 A1 * | 10/2009 | Khatri et al. | 711/6 |
| 2009/0307690 A1 | 12/2009 | Logan et al. | |
| 2009/0313401 A1 | 12/2009 | Mani et al. | |
| 2011/0035618 A1 * | 2/2011 | Jann et al. | 714/3 |
| 2011/0154128 A1 * | 6/2011 | Rajkumari et al. | 714/48 |
| 2011/0154133 A1 * | 6/2011 | Ganti et al. | 714/54 |

* cited by examiner

*Primary Examiner* — Emerson Puente
*Assistant Examiner* — Charles Swift
(74) *Attorney, Agent, or Firm* — Jason H. Sosa; Mark Vallone

(57) ABSTRACT

In a method for managing resources in a virtualized computing environment, a command to initiate execution of an operating system image dump process for a logical partition of the virtualized computing environment is received while the logical partition is in a process of terminating. One or more resources that are allocated to the logical partition that will not be utilized by the logical partition during execution of the operating system image dump process are determined. A notification to a hypervisor program in the virtualized computing environment is sent. The notification identifies the one or more resources. One of the one or more resources is reallocated. The operating system image dump process is executed.

19 Claims, 4 Drawing Sheets

RESOURCE MANAGEMENT IN A VIRTUALIZED ENVIRONMENT

TECHNICAL FIELD

The present invention relates generally to computers with logical partitions, and more specifically to managing resources allocated to the logical partitions to provide a more efficient use of the resources.

BACKGROUND

In system virtualization, multiple virtual systems are created within a single physical system. The physical system can be a stand-alone computer, or alternatively, a computing system utilizing clustered computers and components. Virtual systems are independent operating environments that use virtual resources made up of logical divisions of physical resources such as processors, memory and input/output (I/O) adapters. This system virtualization is implemented through some managing functionality, typically hypervisor technology. Hypervisors, also called virtual machine managers (VMMs), use a thin layer of code in software or firmware to achieve fine-grained, dynamic resource sharing. Because hypervisors provide the greatest level of flexibility in how virtual resources are defined and managed, they are the primary technology for system virtualization.

The hypervisor provides the ability to divide physical system resources into isolated logical partitions (also referred to as LPARs). Each logical partition operates like an independent system running its own operating environment (i.e., a virtual system). Exemplary operating environments include AIX®, IBM® i, Linux®, and the virtual I/O server (VIOS). The hypervisor can allocate dedicated processors, I/O adapters, and memory to each logical partition. The hypervisor can also allocate shared processors to each logical partition. Unbeknownst to the logical partitions, the hypervisor creates a shared processor pool from which the hypervisor allocates virtual processors to the logical partitions as needed. In other words, the hypervisor creates virtual processors from physical processors so that logical partitions can share the physical processors while running independent operating environments.

The hypervisor can also dynamically allocate and deallocate dedicated or shared resources (such as processors, I/O, and memory) across logical partitions while the partitions are actively in use. This is known as dynamic logical partitioning or dynamic LPAR. This allows the hypervisor to dynamically redefine all available system resources to reach optimum capacity for each partition.

In addition to creating and managing the logical partitions, the hypervisor manages communication between the logical partitions via a virtual switch. To facilitate communication, each logical partition may have a virtual adapter for communication between the logical partitions, via the virtual switch. The type of the virtual adapter depends on the operating environment used by the logical partition. Examples of virtual adapters include virtual Ethernet adapters, virtual Fibre Channel adapters, virtual Small Computer Serial Interface (SCSI) adapters, and virtual serial adapters.

Virtual adapters are often implemented through a VIOS partition which manages the physical I/O adapters (SCSI disks, Fibre Channel disks, Ethernet, or CD/DVD optical devices). The other logical partitions may be considered "clients" or virtual I/O clients (VIOCs) to the VIOS. The VIOS can provide virtualized network resources to the other logical partitions via a Shared Ethernet adapter (SEA). The SEA bridges a physical Ethernet adapter with the respective virtual adapters and may apportion network bandwidth.

In the event that one of the logical partitions is terminating abnormally, or crashing, an operating system (OS) image dump process is performed during which diagnostic data about the terminating logical partition is collected, compressed, and written to a storage device. The time that it takes to perform the OS image dump process may, for example, take anywhere from several minutes to an hour to complete. Typically, a number of processors, memory, and I/O resources allocated to the terminating logical partition continue to be used during the OS image dump process.

SUMMARY

In at least one embodiment of the present invention, a method for managing resources in a virtualized computing environment is provided. A computer receives a command to initiate execution of an operating system image dump process for a logical partition of the virtualized computing environment, while the logical partition is in a process of terminating. The computer determines one or more resources that are allocated to the logical partition that will not be utilized by the logical partition during execution of the operating system image dump process. The computer sends a notification to a hypervisor program in the virtualized computing environment, the notification identifying the one or more resources. The computer reallocates one of the one or more resources. The computer executes the operating system image dump process.

In at least one other embodiment, a computer system for managing resources in a virtualized computing environment is provided. The computer system includes one or more processors, one or more computer-readable memories, one or more computer-readable tangible storage devices and program instructions which are stored on the one or more storage devices for execution by the one or more processors via the one or more memories. The program instructions include program instructions to receive a command to initiate execution of an operating system image dump process for a logical partition of the virtualized computing environment, while the logical partition is in a process of terminating. The program instructions further include program instructions to determine one or more resources that are allocated to the logical partition that will not be utilized by the logical partition during execution of the operating system image dump process. The program instructions also include program instructions to send a notification to a hypervisor program in the virtualized computing environment, the notification identifying the one or more resources. The program instructions further include program instructions to reallocate one of the one or more resources. The program instructions further include program instructions to execute the operating system image dump process.

In at least one other embodiment, a computer program product for managing resources in a virtualized computing environment is provided. The computer program product includes one or more computer-readable tangible storage devices and program instructions stored on at least one of the one or more storage devices. The program instructions include program instructions to receive a command to initiate execution of an operating system image dump process for a logical partition of the virtualized computing environment, while the logical partition is in a process of terminating. The program instructions further include program instructions to determine one or more resources that are allocated to the logical partition that will not be utilized by the logical partition during execution of the operating system image dump process. The program instructions also include program instructions to send a notification to a hypervisor program in the virtualized computing environment, the notification identifying the one or more resources. The program instructions further include program instructions to reallocate one of the one or more resources. The program instructions further include program instructions to execute the operating system image dump process.

DETAILED DESCRIPTION

The invention recognizes that, typically, when a logical partition is terminated, the hypervisor is free to reallocate the terminated partition's share of resources to other logical partitions. However, when a logical partition is terminating, for example, due to an error, some of the terminating partition's share of resources continues to be used for a time during execution of the OS image dump process. The hypervisor is unaware that other of the terminating partition's resources are not being used during execution of the OS image dump process. The unused resources remain allocated to the terminating partition and unavailable to other logical partitions throughout the duration of the OS image dump process. Aspects of the present invention address making the unused resources available for use by other clients during execution of the OS image dump process.

Figure 1:
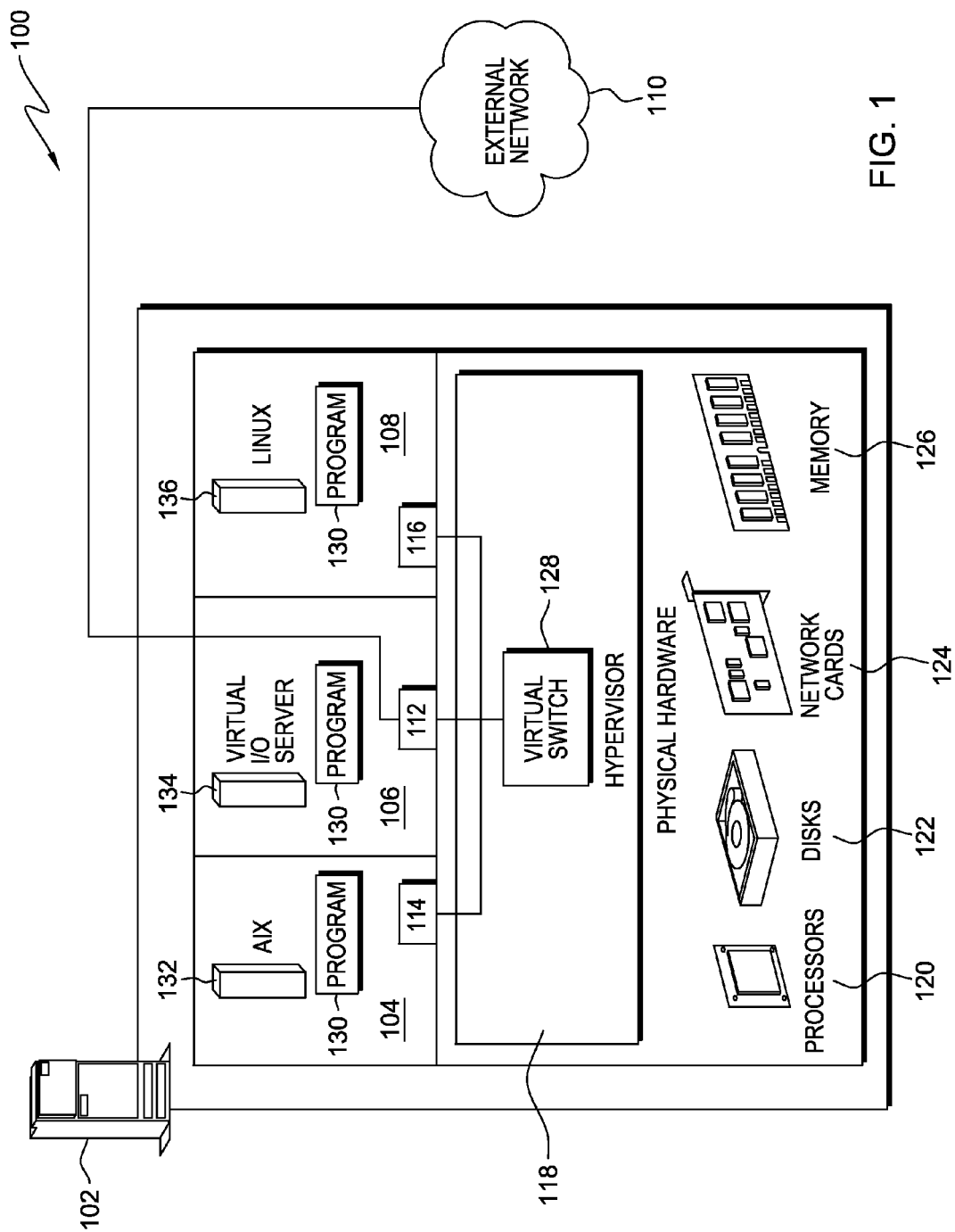
FIG. 1 illustrates a virtualized computer environment for automatically releasing resources allocated to a logical partition that is terminating, according to one embodiment of the present invention.

The present invention will now be described with reference to the figures. FIG. 1 illustrates a virtualized computer environment 100 for automatically releasing resources allocated to a logical partition that is terminating, for example, due to an error, according to one embodiment of the present invention. Virtualized computer environment 100 includes computer 102. Computer 102 has been divided into multiple logical partitions 104, 106, and 108. In the illustrated example, each of the respective logical partitions 104, 106, and 108 runs an independent operating environment, such as an OS. Logical partition 104 runs an OS 132, which can be AIX®, logical partition 106 (hereafter VIOS partition 106) runs a VIOS 134, and logical partition 108 runs an OS 136, which can be Linux®. Other operating environments and combinations of operating environments may be used. In another embodiment, any number of partitions may be created and may exist on separate physical computers of a clustered computer system.

Communications from external network 110 may be routed through Shared Ethernet adapter (SEA) 112 on VIOS partition 106 to virtual adapters 114 and 116 on respective logical partitions 104 and 108. Communications from virtual adapters 114 and 116 on respective logical partitions 104 and 108 may be routed through Shared Ethernet adapter (SEA) 112 on VIOS partition 106 to external network 110. In an alternative embodiment, physical network adapters may be allocated to logical partitions 104, 106, and 108.

Hypervisor 118 forms logical partitions 104, 106 and 108 from the physical resources of computer 102 through logical sharing of designated processors 120, storage disks 122, network cards/capacity 124, and/or memory 126 among logical partitions 104, 106 and 108. Hypervisor 118 performs standard operating system functions and manages communications between logical partitions 104, 106, and 108 via virtual switch 128.

Logical partitions 104, 106, and 108 each include OS image dump manager program 130. Each OS image dump manager program 130 can collect diagnostic data of its respective logical partition 104, 106, or 108 when its respective logical partition is terminating, due to an error for example, and can manage the resources of the terminating partition. Specifically, OS image dump manager program 130 determines which of the terminating logical partition's allocated resources will be utilized during execution of the OS image dump process. Prior to execution of the OS image dump process, OS image dump manager program 130 releases those of the terminating logical partition's allocated resources that will not be utilized during execution of the OS image dump process to the hypervisor 118 for reallocation to one or more other logical partitions. Thus, resources are utilized more efficiently because unnecessary resources do not remain allocated to a terminating logical partition during execution of the OS image dump process. Though in a preferred embodiment, OS image dump manager program 130 releases a terminating logical partition's virtual resources that will not be utilized during execution of the OS image dump process to hypervisor 118, and hypervisor 118 reallocates one or more of those resources to one or more other logical partitions, in another embodiment, hypervisor 118 can similarly reallocate a terminating logical partition's physical resources that will not be utilized during execution of the OS image dump process.

Figure 2:
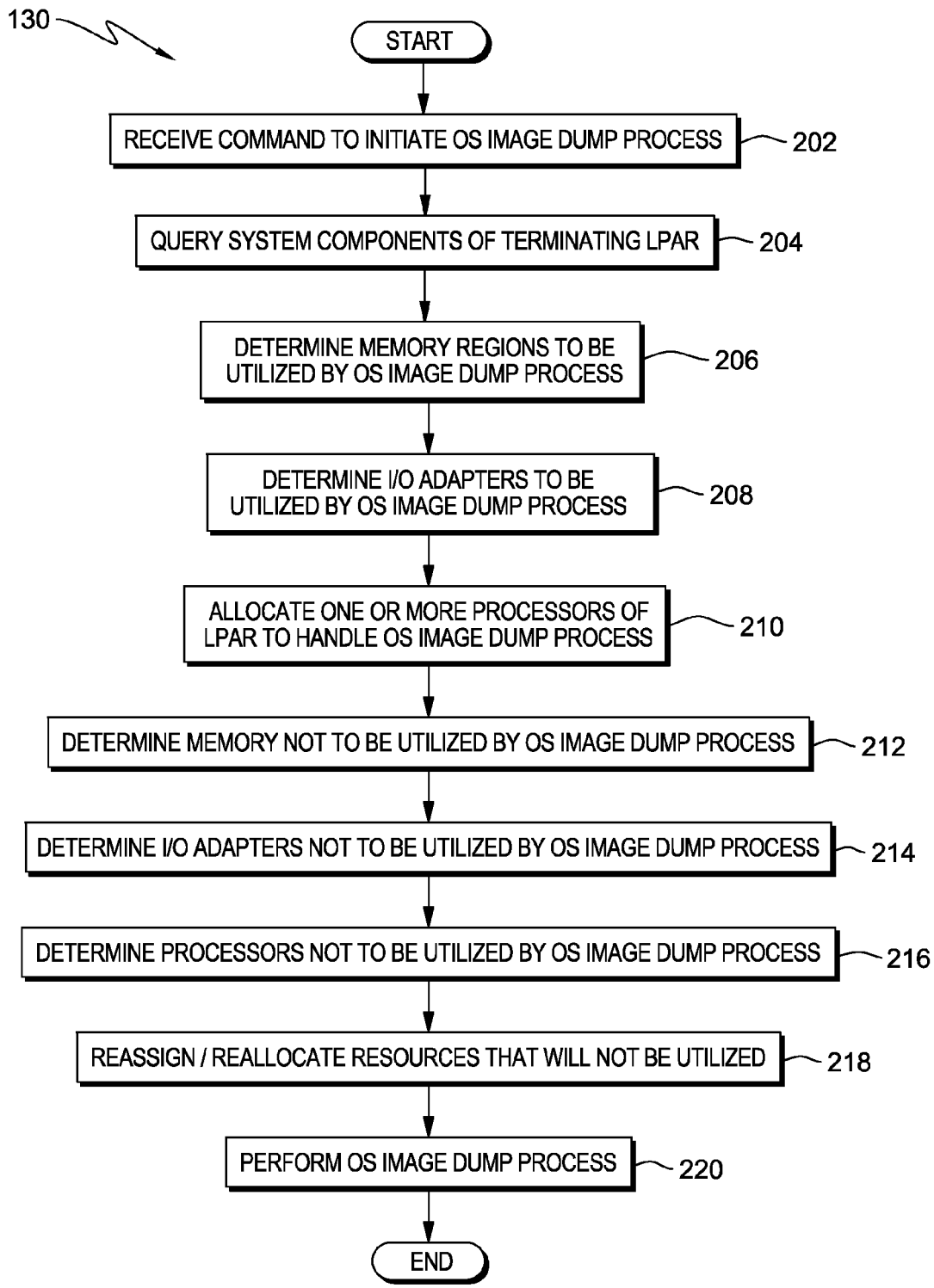
FIG. 2 is a flowchart of a method for managing resources of a terminating logical partition, in accordance with an embodiment of the present invention.

FIG. 2 is a flowchart of a method for managing resources of a terminating logical partition, in accordance with an embodiment of the present invention. For the sake of discussion, assume logical partition 104 on computer 102 is the terminating partition.

OS image dump manager program 130 initiates execution of an OS image dump process for terminating partition 104 (step 202). In one embodiment, OS image dump manager program 130 initiates execution of an OS image dump process for terminating partition 104 in response to a command from trap handling code. For example, as OS 132 runs, an exceptional condition or event may occur to cause a "trap." A trap is also known as an exception or fault. Though not all exceptional conditions or events (i.e., an attempt to divide by zero, a breakpoint in debugging) cause termination of a logical partition, other exceptional conditions or events (i.e., an attempt to access an invalid memory location, an explicit request from an OS component to halt the OS due to a severe error condition, etc.) can be extremely disruptive to a logical partition. In response to an exceptional condition or event that causes terminating of logical partition 104, trap handling code halts the normal operation of OS 132 and diverts control to OS image dump manager program 130.

OS image dump manager program 130 queries system components of logical partition 104 to determine which resources allocated to logical partition 104 will be utilized during execution of the OS image dump process (step 204). In one embodiment, OS image dump manager program 130 queries system components of logical partition 104 to determine which resources allocated to logical partition 104 will be utilized during execution of the OS image dump process in response to receiving the command at step 202. The system components are the software modules and device drivers that make up OS 132. Typical system components that OS image dump manager program 130 queries include core OS components such as a Virtual Memory Manager and a process management subsystem. Other components that OS image dump manager program 130 queries may be optional components that are resident in logical partition 104 and/or loaded only when needed, such as a logical volume manager and various device drivers. In one embodiment, OS image dump manager program 130 queries the system components of logical partition 104 by making a function call to each system component.

In another embodiment, OS image dump manager program 130 includes in the query a request that the components elect or nominate I/O adapters to include in the OS image dump. Components might elect an I/O adapter containing data that should be included in the OS image dump. For example, if an Ethernet adapter device driver component of OS 132 initiated the terminating of logical partition 104, then the Ethernet adapter device driver component of OS 132 might want to collect operating information from the associated adapter to be included in the OS image dump.

In other embodiments, the queried components might identify other virtual resources necessary for the OS image dump process.

OS image dump manager program 130 determines the memory regions allocated to logical partition 104 that will be utilized during execution of the OS image dump process (step 206). OS image dump manager program 130 determining the memory regions that will be utilized during execution of the OS image dump process may include OS image dump manager program 130 determining the memory regions to be included in the OS image dump based on responses to queries made at step 204. For example, query responses from one or more of the queried components may include a populated data structure that describes memory regions to include in the OS image dump as diagnostic data (e.g., from address 0x00001000 spanning for 10 pages, from address 0x03200000 spanning for 17 pages, etc.). Also, the step of OS image dump manager program 130 determining the memory regions that will be utilized during execution of the OS image dump process may include OS image dump manager program 130 determining the memory regions that are needed in executing the program code that performs the OS image dump process. The memory regions that are needed in executing the program code may be pre-allocated prior to the execution of the program code, and OS image dump manager program 130 may query itself to determine the memory regions needed to execute the program code. In another embodiment, OS image dump manager program 130 allocates one or more available memory regions for the OS image dump process based on the size of the OS image dump determined by the responses from the queried components.

OS image dump manager program 130 determines the I/O adapters allocated to logical partition 104 that will be utilized during execution of the OS image dump process (step 208). OS image dump manager program 130 determining the I/O adapters that will be utilized during execution of the OS image dump process may include OS image dump manager program 130 using responses to the queries made at step 204 to determine the I/O adapters whose data will be included in the OS image dump. Also, OS image dump manager program 130 determining the I/O adapters that will be utilized during execution of the OS image dump process may include OS image dump manager program 130 determining I/O adapters (e.g., a Fibre Channel disk storage-attachment adapter) that will be used in executing the program code that performs the OS image dump process itself. For example, the executing OS image dump process may write the dump image to a storage device (generally a disk external to computer 102) attached via a storage-attachment adapter (e.g., Fibre Channel adapter, SCSI adapter).

OS image dump manager program 130 allocates one or more processors of logical partition 104 to handle executing the OS image dump process (step 210). In an embodiment of the present invention, OS image dump manager program 130 determines how much processing capacity is necessary to execute the OS image dump process based upon the size of the dump image to be written, and selects only the amount of processors necessary to meet that capacity.

OS image dump manager program 130 determines memory that is allocated to logical partition 104 that will not be utilized during execution of the OS image dump process (step 212). In one embodiment, OS image dump manager program 130 compares the memory regions that will be utilized during execution of the OS image dump process determined at step 206 to all of the memory allocated to logical partition 104 to find the memory that will not be utilized during execution of the OS image dump process. The memory that will not be utilized during execution of the OS image dump process may be referred to as the available memory.

OS image dump manager program 130 determines the I/O adapters that will not be utilized during execution of the OS image dump process (step 214). In one embodiment, OS image dump manager program 130 compares the I/O adapters that will be utilized during execution of the OS image dump process determined at step 208 to all of the I/O adapters allocated to logical partition 104. The I/O adapters that will not be utilized during execution of the OS image dump process may be referred to as the available I/O adapters.

OS image dump manager program 130 determines the processors that will not be utilized during execution of the OS image dump process (step 216) by comparing the processors allocated to logical partition 104 to handle executing the OS image dump process at step 210 to all the processors allocated to logical partition 104. The processors that will not be utilized during execution of the OS image dump process may be referred to as the available processors.

If OS image dump manager program 130 finds any other resources that will be utilized during execution of the OS image dump process, OS image dump manager program 130 may compare those resources to resources assigned to logical partition 104 to determine any resources that will not be utilized during execution of the OS image dump process. The resources that will not be utilized during execution of the OS image dump process are available for reallocation.

After determining the available resources at steps 212, 214, and 216, OS image dump manager program 130 releases the available resources (step 218). In a preferred embodiment, OS image dump manager program 130 notifies hypervisor 118 that these available resources are available, releasing logical partition 104's allocation of the available resources so that hypervisor 118 may reassign/reallocate the available resources to other logical partitions. In one embodiment, by OS image dump manager program 130 notifying hypervisor 118 of the available resources, the available resources are effectively released to a free or common pool of resources.

For example, designated processors 120 on computer 102 might comprise four physical processors assigned to a common pool. Logical partition 104 and logical partition 108 might each contain four virtual processors backed by the physical processors in the pool. During normal operation, each virtual processor consumes approximately half a share of a physical processor (four physical processors backing eight virtual processors). In response to logical partition 104 terminating, for example, due to an error, OS image dump manager program 130 locates one or more virtual processors of logical partition 104 not allocated to handle executing the OS image dump process, and releases the one or more virtual processors, i.e., the processing capacity designated to the one or more virtual processors, back to the common pool. Hypervisor 118 may reallocate released processing capacity (either in the form of additional virtual processors or a greater percentage of physical processor backing) to logical partition 108, which may be taking on logical partition 104's workload.

In another embodiment, an administrator of computer 102 may predetermine where the released available resources will be reallocated.

In yet another embodiment, in addition to notifying hypervisor 118 of the available resources and allowing them to be reallocated in a predetermined way (i.e., back to common pool or at administrator's direction), OS image dump manager program 130 may also direct or suggest to hypervisor 118 where one or more of the released available resources should be reallocated. For example, companion operating systems might periodically exchange information about workload levels and resource constraints. OS image dump manager program 130 (or some other component/program of the terminating partition) may send this information to hypervisor 118, or may determine itself which companion OS may benefit most from one or more of the released available resources and direct/suggest to hypervisor 118 reallocating one or more of the released available resources to a logical partition running the companion OS.

In another embodiment, computer 102 may power down the available resources to conserve electricity after OS image dump manager program 130 has released the available resources.

As an alternative to determining all the available resources at steps 212, 214, and 216 and subsequently releasing them at step 218, in one embodiment, OS image dump manager program 130 releases the resources as OS image dump manager program 130 determines that the resources are available at steps 212, 214, and 216 (e.g., OS image dump manager program 130 determines memory that will not be utilized during execution of the OS image dump process and releases the determined memory prior to determining available I/O adapters).

Finally, after releasing available resources, OS image dump manager program 130 proceeds with initiating the OS image dump process (step 220). The OS image dump process comprises collecting the diagnostic data about terminating partition 104, compressing the diagnostic data, and writing the diagnostic data. As previously discussed, the OS image dump process writes the dump image to a storage device attached via a storage-attachment adapter. As each block of memory is ready to be written, OS image dump manager program 130 issues a write request to the storage-attachment adapter to write the block to the storage device. As the OS image dump process writes the data, virtual resources containing the written data, i.e., various memory regions and I/O adapters, are no longer needed by the OS image dump process and become available for reallocation. In one embodiment, OS image dump manager program 130 releases these virtual resources as they become available for reallocation.

Figure 3:
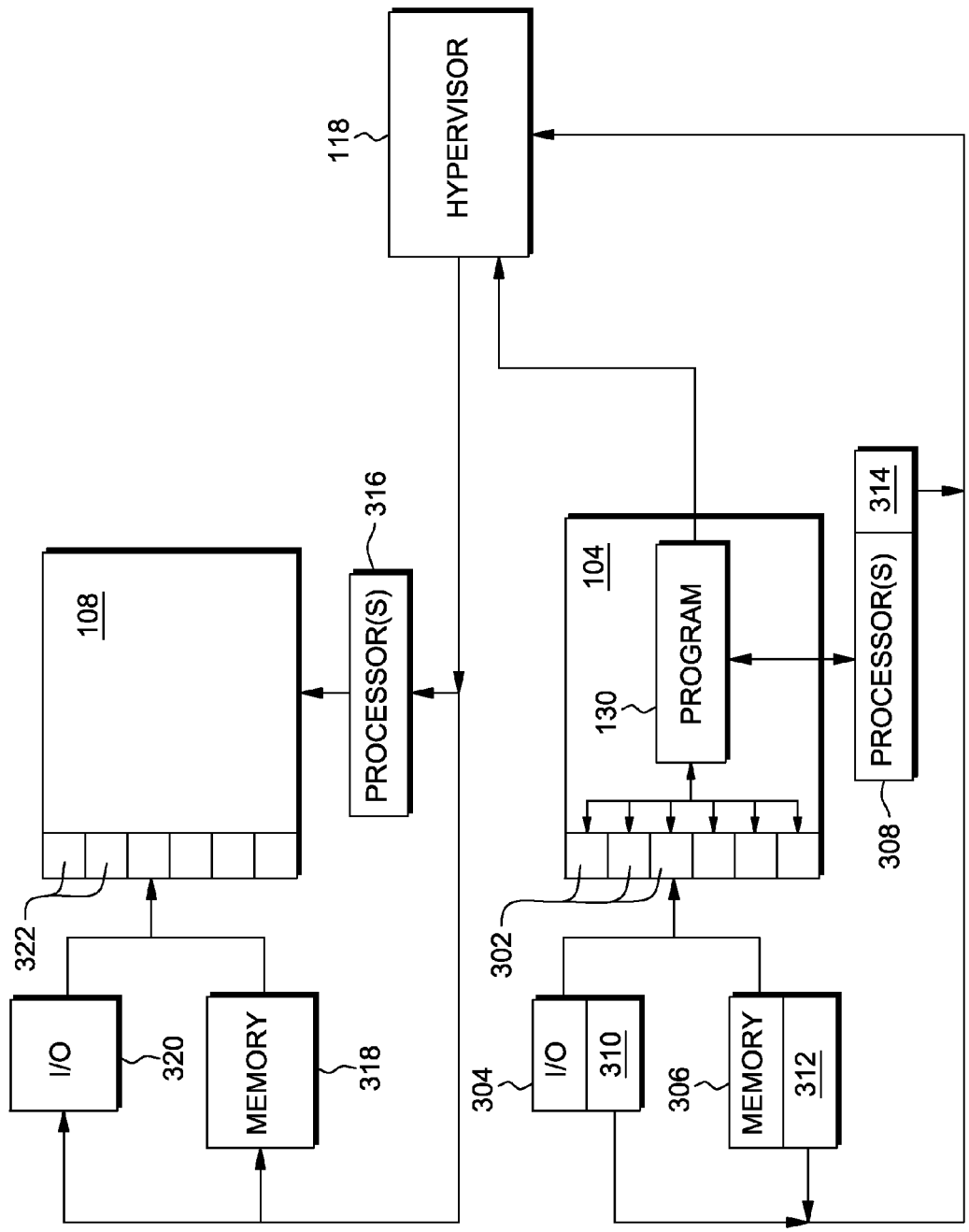
FIG. 3 illustrates a data flow diagram of an embodiment of the present invention.

FIG. 3 illustrates a data flow diagram of an embodiment of the present invention. An instance of OS image dump manager program 130 resides on logical partition 104. In response to an error (e.g., an exception or a fault) causing logical partition 104 to begin terminating, OS image dump manager program 130 receives a command to initiate execution of an OS image dump process for logical partition 104.

In response to receiving the command, OS image dump manager program 130 queries components 302 to determine which resources allocated to logical partition 104 will be utilized during execution of the OS image dump process. Components 302 represent programs that make up and operate in the operating environment of logical partition 104. Components 302 are backed by and utilize virtual I/O adapters 304, virtual memory 306, and virtual processors 308. Though not shown, these virtual resources are backed by physical I/O adapters, physical memory, and physical processors respectively.

OS image dump manager program 130 determines the memory regions allocated to logical partition 104 that will be utilized during execution of the OS image dump process. OS image dump manager program 130 determining the memory regions allocated to logical partition 104 that will be utilized during execution of the OS image dump process may include OS image dump manager program 130 determining the memory regions to be included in the OS image dump based upon the responses to the queries to components 302. Also, OS image dump manager program 130 determining the memory regions that will be utilized during execution of the OS image dump process may include OS image dump manager program 130 determining the memory regions that are needed in executing the program code that performs the OS image dump process.

OS image dump manager program 130 determines the I/O adapters allocated to logical partition 104 that will be utilized during execution of the OS image dump process. OS image dump manager program 130 determining the I/O adapters that will be utilized during execution of the OS image dump process may include OS image dump manager program 130 using responses to the queries to components 302 to determine the I/O adapters whose data will be included in the OS image dump. Also, OS image dump manager program 130 determining the I/O adapters that will be utilized during execution of the OS image dump process may include OS image dump manager program 130 determining I/O adapters that will be used in executing the program code that performs the OS image dump process itself.

Based on the determinations of the memory regions and the I/O adapters allocated to logical partition 104 that will be utilized during execution of the OS image dump process, OS image dump manager program 130 determines available I/O adapters 310 and available memory 312 that can be released before the OS image dump process initiates.

Additionally, based upon responses to the queries that OS image dump manager program 130 receives from components 302, OS image dump manager program 130 determines the size of the OS image dump and, from the size, processors that will be utilized during execution of the OS image dump process and hence the available processors 314 that can be released.

OS image dump manager program 130 notifies hypervisor 118 of available I/O adapters 310, available memory 312, and available processors 314. Hypervisor 118, which can allocate and move resources, also communicates with virtual processors 316, virtual memory 318, and virtual I/O adapters 320, which provide support and are utilized by components 322 of logical partition 108. In one embodiment, hypervisor 118 reallocates available I/O adapters 310, available memory 312, and available processors 314 to logical partition 108 to add to virtual I/O adapters 320, virtual memory 318, and virtual processors 316 respectively.

Figure 4:
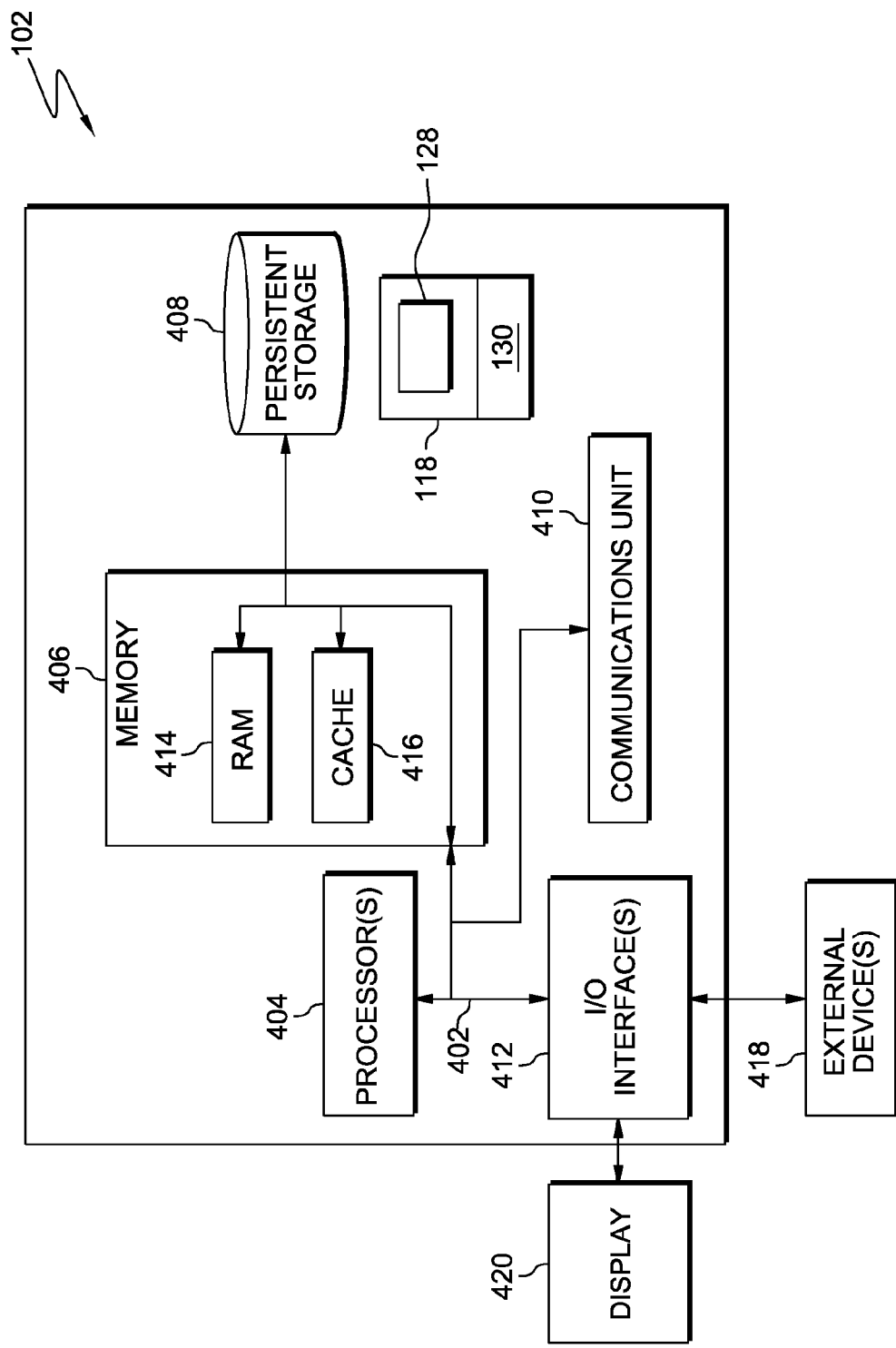
FIG. 4 depicts a block diagram of components of a computer in accordance with an illustrative embodiment.

FIG. 4 depicts a block diagram of components of computer 102 in accordance with an illustrative embodiment. It should be appreciated that FIG. 4 provides only an illustration of one implementation and does not imply any limitations with regard to the environment in which different embodiments may be implemented. Many modifications to the depicted environment may be made.

Computer 102 is representative of any electronic device capable of executing machine-readable program instructions and hosting a virtualized computer environment.

Computer 102 includes communications fabric 402, which provides communications between processor(s) 404, memory 406, persistent storage 408, communications unit 410, and input/output (I/O) interface(s) 412. Processor(s) 404 include, at least in part, designated processors 120 in FIG. 1 to be shared among logical partitions.

Memory 406 and persistent storage 408 are examples of computer-readable tangible storage devices. A storage device is any piece of hardware that is capable of storing information, such as, data, program code in functional form, and/or other suitable information on a temporary basis and/or permanent basis. Memory 406 may be, for example, one or more random access memories (RAM) 414, cache memory 416, or any other suitable volatile or non-volatile storage device. Memory 406 includes, at least in part, designated memory 126 depicted in FIG. 1 to be shared among logical partitions.

Hypervisor 118, with virtual switch 128, and instances of OS image dump manager program 130 are stored in persistent storage 408 for execution by one or more of the respective processors 404 via one or more memories of memory 406. Persistent storage 408 includes, at least in part, designated storage disks 122 depicted in FIG. 1 to be shared by logical partitions. The instances of OS image dump manager program 130 reside in portions of designated storage disks 122 or designated memory 126 that are allocated to respective logical partitions 104, 106, and 108. In the embodiment illustrated in FIG. 4, persistent storage 408 includes flash memory. Alternatively, or in addition to, persistent storage 408 may include a magnetic disk storage device of an internal hard drive, a solid state drive, a semiconductor storage device, read-only memory (ROM), EPROM, or any other computer-readable tangible storage device that is capable of storing program instructions or digital information.

The media used by persistent storage 408 may also be removable. For example, a removable hard drive may be used for persistent storage 408. Other examples include an optical or magnetic disk that is inserted into a drive for transfer onto another storage device that is also a part of persistent storage 408, or other removable storage devices such as a thumb drive or smart card.

Communications unit 410, in these examples, provides for communications with other data processing systems or devices. In these examples, communications unit 410 includes one or more network interface cards. Communications unit 410 may provide communications through the use of either or both physical and wireless communications links. In another embodiment still, computer 102 may be devoid of communications unit 410. Hypervisor 118 and OS image dump manager program 130 may be downloaded to persistent storage 408 through communications unit 410. Communications unit 410 includes, at least in part, designated network cards 124 depicted in FIG. 1 to be shared by the logical partitions, preferably through VIOS partition 106.

I/O interface(s) 412 allows for input and output of data with other devices that may be connected to computer 102. For example, I/O interface 412 may provide a connection to external devices 418, such as a keyboard, keypad, a touch screen, and/or some other suitable input device. I/O interface(s) may also connect to a display 420. In a preferred embodiment, I/O interfaces are also shared among logical partitions via VIOS partition 106.

Display 420 provides a mechanism to display information to a user.

The aforementioned programs can be written in various programming languages (such as Java or C++) including low-level, high-level, object-oriented or non object-oriented languages. Alternatively, the functions of the aforementioned programs can be implemented in whole or in part by computer circuits and other hardware (not shown).

Based on the foregoing, a method, computer system, and computer program product have been disclosed for managing resources in a virtualized computer environment. However, numerous modifications and substitutions can be made without deviating from the scope of the present invention. In this regard, each block in the flowcharts or block diagrams may represent a module, segment, or portion of code, which comprises one or more executable instructions for implementing the specified logical functions(s). It should also be noted that, in some alternative implementations, the functions noted in the block may occur out of the order noted in the figures. Therefore, the present invention has been disclosed by way of example and not limitation.

What is claimed is:

1. A method for managing resources in a virtualized computing environment, the method comprising the steps of:
   receiving a command to initiate execution of an operating system image dump process for a logical partition of the virtualized computing environment, while the logical partition is in a process of terminating;
   before the operating system image dump process is initiated, the logical partition determining one or more resources that are allocated to the logical partition that will not be utilized by the logical partition during execution of the operating system image dump process;
   sending a notification from the logical partition to a hypervisor program in the virtualized computing environment, the notification identifying the determined one or more resources; and
   reallocating one of the determined one or more resources using the hypervisor program.

2. The method of claim 1, wherein the one or more resources include one or more memory regions that will not be utilized by the logical partition during execution of the operating system image dump process, and wherein the step of the logical partition determining the one or more resources that will not be utilized by the logical partition during execution of the operating system-image dump process comprises the steps of:
   querying system components of the logical partition for memory regions from which diagnostic data may be collected;
   identifying memory regions needed in executing program code implementing the operating system image dump process; and
   the logical partition forming a list of memory regions that will not be used by the operating system image dump process, the list excluding the memory regions from which diagnostic data may be collected and the memory regions needed in executing the program code implementing the operating system image dump process.

3. The method of claim 1, wherein the one or more resources include one or more input/output (I/O) adapters that will not be utilized by the logical partition during execution of the operating system image dump process, and wherein the step of the logical partition determining the one or more resources that will not be utilized by the logical partition during execution of the operating system image dump process comprises the steps of:
    querying system components for I/O adapters containing data which should be included in an operating system image dump;
    identifying I/O adapters that will be used during execution of program code implementing the operating system image dump process; and
    the logical partition forming a list of I/O adapters that will not be used by the operating system image dump process, the list excluding the I/O adapters containing data which should be included in an operating system image dump and the I/O adapters that will be used during execution of the program code implementing the operating system image dump process.

4. The method of claim 1, wherein the one or more resources include one or more processors that will not be utilized by the logical partition during execution of the operating system image dump process, and wherein the step of the computer determining the one or more resources that will not be utilized by the logical partition during execution of the operating system image dump process comprises the steps of:
    determining one or more processors allocated to the logical partition that will be utilized by the logical partition during execution of the operating system image dump process based on a size of a dump image to be written by the operating system image dump process; and
    the logical partition determining the one or more processors that will not be utilized by the logical partition during execution of the operating system image dump process by comparing the processors that will be utilized by the logical partition during execution of the operating system image dump process to all processors allocated to the logical partition.

5. The method of claim 1, further comprising the step of the logical partition suggesting to the hypervisor program a second logical partition in the virtual computing environment to which to allocate the determined one of the one or more resources.

6. The method of claim 5, further comprising the steps of:
    before the step of logical partition suggesting the second logical partition, receiving, at the logical partition, workload levels and resource constraints of the second logical partition, wherein the suggesting is based on the received workload levels and resource constraints.

7. The method of claim 1, further comprising the step of adding the one of the one or more resources to a common pool of resources for the virtual computing environment.

8. A computer system for managing resources in a virtualized computing environment, the computer system comprising:
    one or more processors, one or more computer-readable memories, one or more computer-readable tangible storage devices and program instructions which are stored on the one or more storage devices for execution by the one or more processors via the one or more memories, the program instructions comprising:
    program instructions to initiate execution of an operating system image dump process for a logical partition of the virtualized computing environment, while the logical partition is in a process of terminating;
    program instructions to, before the operating system image dump process is initiated, determine, at the logical partition, one or more resources that are allocated to the logical partition that will not be utilized by the logical partition during execution of the operating system image dump process;
    program instructions to send a notification from the logical partition to a hypervisor program in the virtualized computing environment, the notification identifying the determined one or more resources; and
    program instructions to reallocate one of the determined one or more resources using the hypervisor program.

9. The computer system of claim 8, wherein the one or more resources include one or more memory regions that will not be utilized by the logical partition during execution of the operating system image dump process, and wherein the program instructions to determine the one or more resources that will not be utilized by the logical partition during execution of the operating system image dump process comprise:
    program instructions to query system components of the logical partition for memory regions from which diagnostic data may be collected;
    program instructions to identify memory regions needed in executing program code implementing the operating system image dump process; and
    program instructions to form a list of memory regions that will not be used by the operating system image dump process, the list excluding the memory regions from which diagnostic data may be collected and the memory regions needed in executing the program code implementing the operating system image dump process.

10. The computer system of claim 8, wherein the one or more resources include one or more input/output (I/O) adapters that will not be utilized by the logical partition during execution of the operating system image dump process, and wherein the program instructions to determine the one or more resources that will not be utilized by the logical partition during execution of the operating system image dump process comprise:
    program instructions to query system components of for I/O adapters containing data which should be included in an operating system image dump;
    program instructions to identify I/O adapters that will be used during execution of program code implementing the operating system image dump process; and
    program instructions to form a list of I/O adapters that will not be used by the operating system image dump process, the list excluding the I/O adapters containing data which should be included in an operating system image dump and the I/O adapters that will be used during execution of the program code implementing the operating system image dump process.

11. The computer system of claim 8, wherein the one or more resources include one or more processors that will not be utilized by the logical partition during execution of the operating system image dump process, and wherein the program instructions to determine the one or more resources that will not be utilized by the logical partition during execution of the operating system image dump process comprise:
    program instructions to determine one or more processors allocated to the logical partition that will be utilized by the logical partition during execution of the operating system image dump process based on a size of a dump image to be written by the operating system image dump process; and
    program instructions to determine the one or more processors that will not be utilized by the logical partition during execution of the operating system image dump process by comparing the processors that will be utilized by the logical partition during execution of the operating system image dump process to all processors allocated to the logical partition.

12. The computer system of claim 8, further comprising program instructions, stored on at least one of the one or more storage devices for execution by at least one of the one or more processors via at least one of the one or more memories, to suggest, by the logical partition to the hypervisor program, a second logical partition in the virtual computing environment to which to allocate the determined one of the one or more resources.

13. The computer system of claim 12, further comprising program instructions, stored on at least one of the one or more storage devices for execution by at least one of the one or more processors via at least one of the one or more memories, to:
  before suggesting to the hypervisor program the second logical partition receive, at the logical partition, workload levels and resource constraints of the second logical partition, wherein the suggesting is based on the received workload levels and resource constraints.

14. A computer program product for managing resources in a virtualized computing environment, the computer program product comprising:
  one or more computer-readable tangible storage devices and program instructions stored on at least one of the one or more storage devices, the program instructions comprising:
  program instructions to initiate execution of an operating system image dump process for a logical partition of the virtualized computing environment, while the logical partition is in a process of terminating;
  program instructions to, before the operating system image dump process is initiated, determine, at the logical partition, one or more resources that are allocated to the logical partition that will not be utilized by the logical partition during execution of the operating system image dump process;
  program instructions to send a notification from the logical partition to a hypervisor program in the virtualized computing environment, the notification identifying the determined one or more resources; and
  program instructions to reallocate one of the determined one or more resources using the hypervisor program.

15. The computer program product of claim 14, wherein the one or more resources include one or more memory regions that will not be utilized by the logical partition during execution of the operating system image dump process, and wherein the program instructions to determine the one or more resources that will not be utilized by the logical partition during execution of the operating system image dump process comprises:
  program instructions to query system components of the logical partition for memory regions from which diagnostic data may be collected;
  program instructions to identify memory regions needed in executing program code implementing the operating system image dump process; and
  program instructions to form a list of memory regions that will not be used by the operating system image dump process, the list excluding the memory regions from which diagnostic data may be collected and the memory regions needed in executing the program code implementing the operating system image dump process.

16. The computer program product of claim 14, wherein the one or more resources include one or more input/output (I/O) adapters that will not be utilized by the logical partition during execution of the operating system image dump process, and wherein the program instructions to determine the one or more resources that will not be utilized by the logical partition during execution of the operating system image dump process comprise:
  program instructions to query system components of for I/O adapters containing data which should be included in an operating system image dump;
  program instructions to identify I/O adapters that will be used during execution of program code implementing the operating system image dump process; and
  program instructions to form a list of I/O adapters that will not be used by the operating system image dump process, the list excluding the I/O adapters containing data which should be included in an operating system image dump and the I/O adapters that will be used during execution of the program code implementing the operating system image dump process.

17. The computer program product of claim 14, wherein the one or more resources include one or more processors that will not be utilized by the logical partition during execution of the operating system image dump process, and wherein the program instructions to determine the one or more resources that will not be utilized by the logical partition during execution of the operating system image dump process comprise:
  program instructions to determine one or more processors allocated to the logical partition that will be utilized by the logical partition during execution of the operating system image dump process based on a size of a dump image to be written by the operating system image dump process; and
  program instructions to determine the one or more processors that will not be utilized by the logical partition during execution of the operating system image dump process by comparing the processors that will be utilized by the logical partition during execution of the operating system image dump process to all processors allocated to the logical partition.

18. The computer program product of claim 14, further comprising program instructions, stored on at least one of the one or more storage devices, to suggest, by the logical partition to the hypervisor program, a second logical partition in the virtual computing environment to which to allocate the determined one of the one or more resources.

19. The computer program product of claim 18, further comprising program instructions, stored on at least one of the one or more storage devices, to:
  before suggesting to the hypervisor program the second logical partition, receive, at the logical partition, workload levels and resource constraints of the second logical partition, wherein the suggesting is based on the received workload levels and resource constraints.

* * * * *